No. 697,246. Patented Apr. 8, 1902.
J. HALL.
MECHANISM FOR MEASURING AND RECORDING MEASUREMENTS OF MATERIAL.
(Application filed May 3, 1901.)
(No Model.) 5 Sheets—Sheet 1.

Witnesses:

Inventor:-
Joseph Hall
by Eustace W. Hopkins
Atty

No. 697,246. Patented Apr. 8, 1902.
J. HALL.
MECHANISM FOR MEASURING AND RECORDING MEASUREMENTS OF MATERIAL.
(Application filed May 3, 1901.)
(No Model.) 5 Sheets—Sheet 3.

Witnesses:

Inventor:-
Joseph Hall
by Eustace W Hopkins
Atty.

No. 697,246. Patented Apr. 8, 1902.
J. HALL.
MECHANISM FOR MEASURING AND RECORDING MEASUREMENTS OF MATERIAL.
(Application filed May 3, 1901.)
(No Model.) 5 Sheets—Sheet 5.

Witnesses. Inventor:-
Joseph Hall

UNITED STATES PATENT OFFICE.

JOSEPH HALL, OF LEEDS, ENGLAND.

MECHANISM FOR MEASURING AND RECORDING MEASUREMENTS OF MATERIAL.

SPECIFICATION forming part of Letters Patent No. 697,246, dated April 8, 1902.

Application filed May 3, 1901. Serial No. 58,653. (No model.)

*To all whom it may concern:*

Be it known that I, JOSEPH HALL, a subject of the King of Great Britain, residing at Burley Engine Works, Leeds, England, have invented certain new and useful Improvements in Machinery for Registering, Measuring, and Counting Material, of which the following is a full, clear, and exact description.

The present invention relates to machinery for measuring skins and similar purposes; and it consists, essentially, in applying to the same a printing and recording device by means of which the measure of each skin and the current number of the same will be printed on the skin and at the same time recorded on an endless tape or band which passes a second printing-wheel.

In order to render the present specification easily intelligible, reference is had to the accompanying drawings, in which similar letters of reference denote similar parts throughout the several views.

Figure 1:
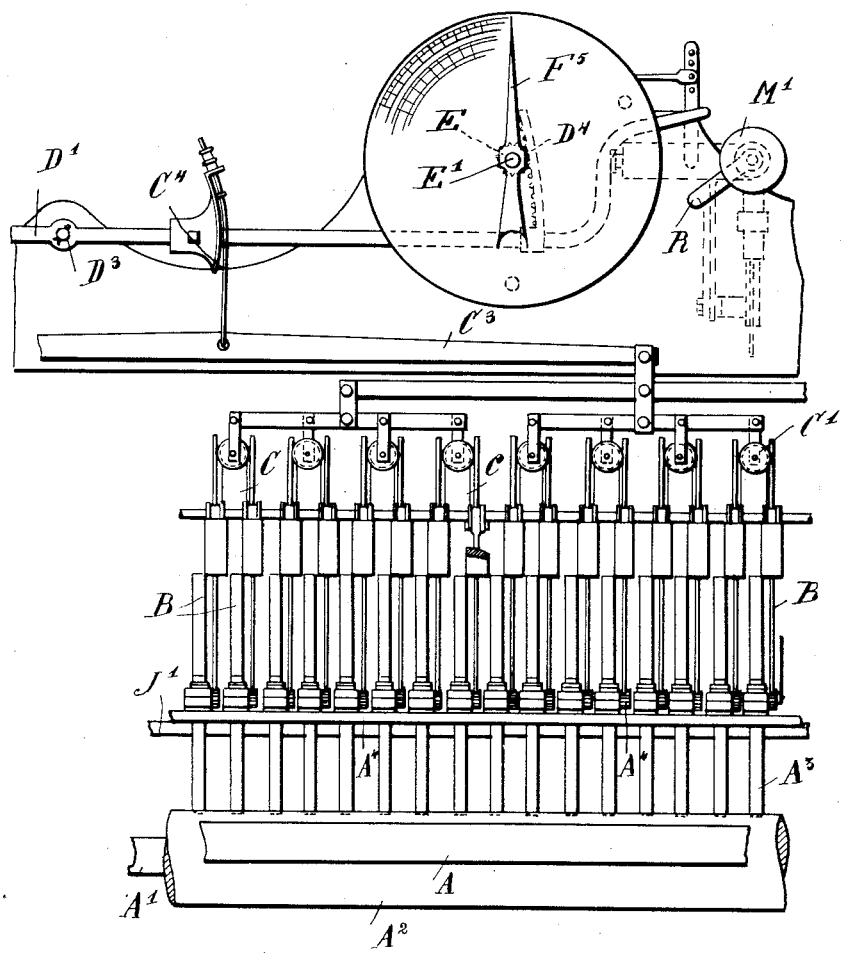
Figure 2:
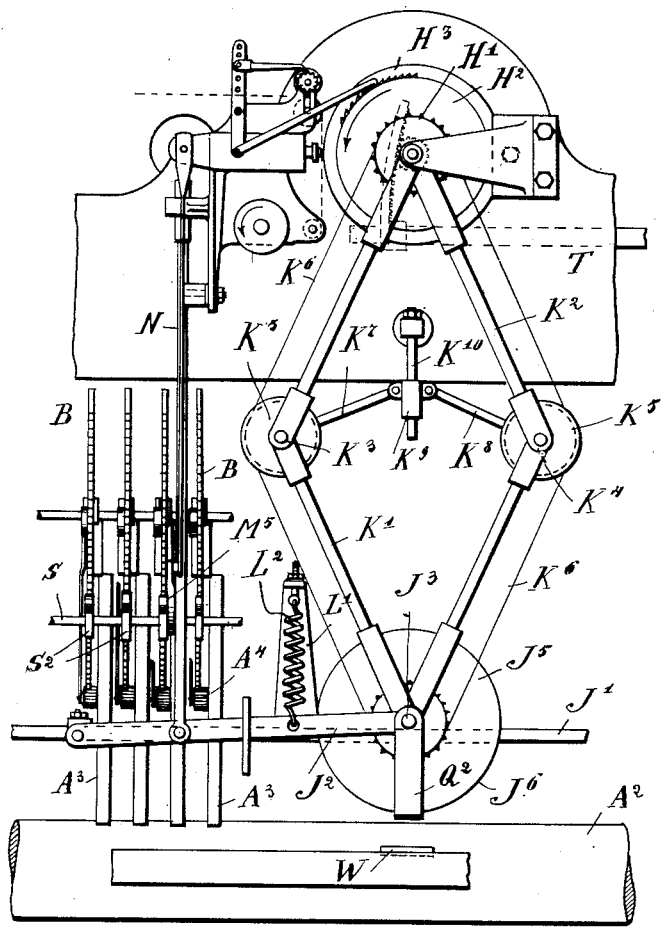
Figure 3:
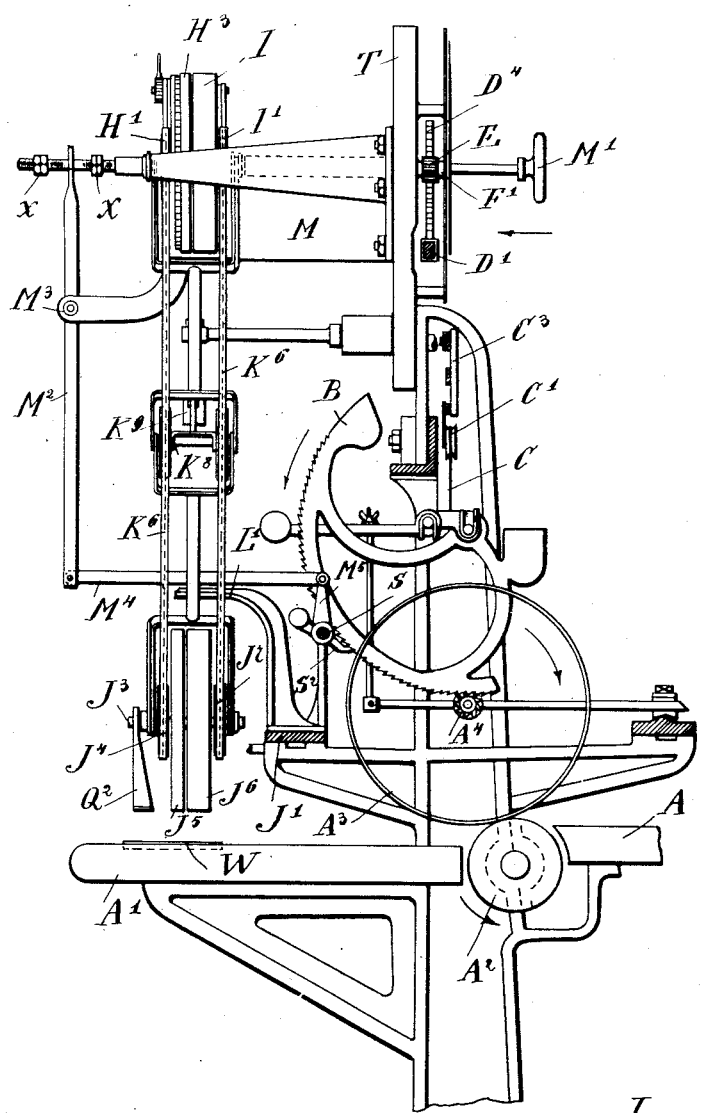
Figure 4:
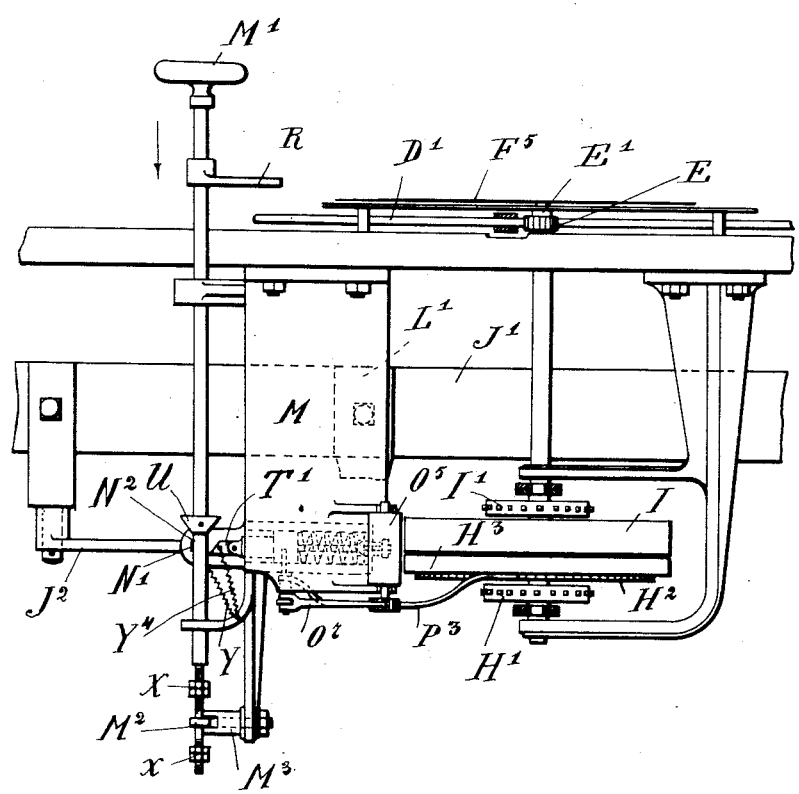
Figure 5:
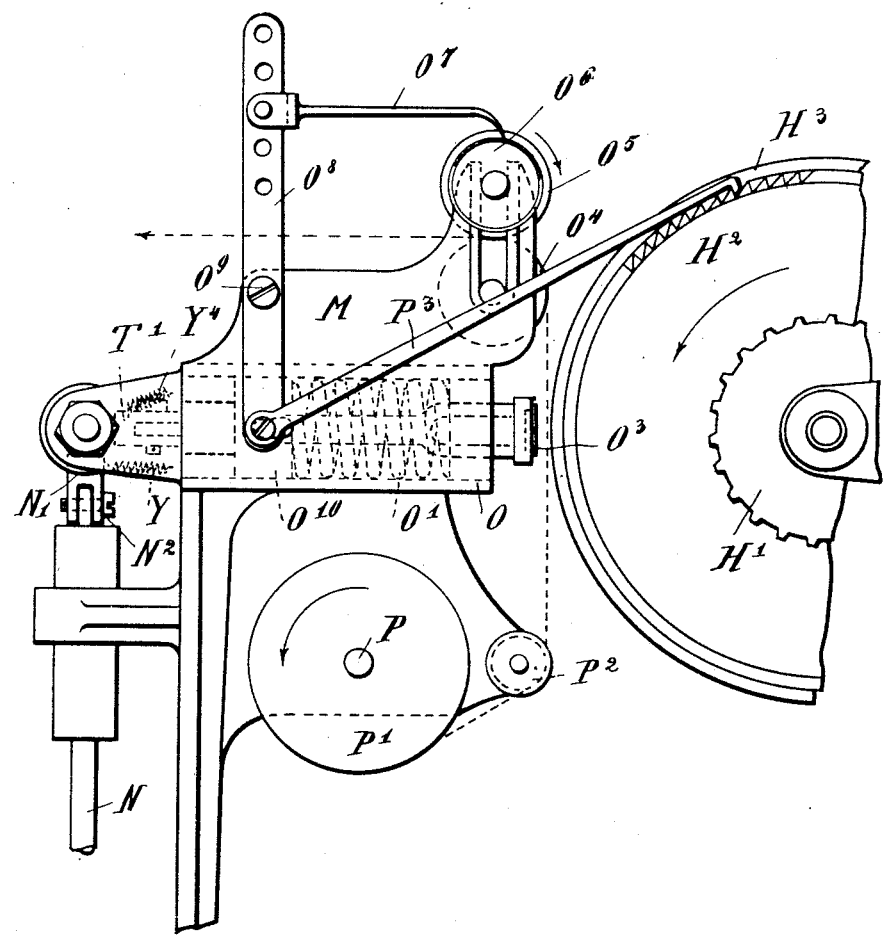

Figure 1 is a part front elevation of the machine; Fig. 2, a part rear elevation; Fig. 3, a side elevation; Fig. 4, a plan drawn to a larger scale, and Fig. 5 a part elevation showing the inking and printing mechanism.

I will first proceed to describe those parts of the known weighing or measuring machine which are necessary to enable the proper comprehension of the present invention.

One of the best-known types of skin-measuring machines is illustrated in the accompanying drawings, and, referring to Figs. 1 to 3, the skin is passed over the feed-table A, feed-roll $A^2$, to the delivery-table A', and in its passage over the roll $A^2$ it makes contact with a set of rolls $A^3$, which are normally raised just off the feed-roll $A^2$, so that the said rolls $A^3$ will only be turned when a skin is between them and the feed-roll. The rolls $A^3$ are each suspended in separate bearings in the well-known manner and carry a pinion $A^4$, which engages a segment B. Thus when the friction-rolls $A^3$ are turned by the skin passing between them and the feed-roll the segments B will be turned, and being coupled up two and two by means of a cord $c$, passing over rolls C', Fig. 1, they operate a lever system $C^3$ to depress, by means of the connection $C^4$, a weighted lever D'. This latter lever is pivotally attached to the machine-frame at $D^3$ and carries at its free end a segment having teeth, as at $D^4$, which segment engages a pinion on the spindle E' of the dial indicating-hand $F^5$. These parts are all known and do not form part of the present invention. The operation is that when a skin is passed through the rolls $A^2$ and $A^3$ they will be turned as long as the skin is lying between them, and as soon as it has passed them a weighted pawl $s^2$ drops into the teeth of each segment B and retains the same in its end position until the number or measurement on the dial has been read off and noted, whereupon the pawls are released simultaneously and the quadrants or segments B fall back to their normal positions, owing to the contact between the feed-roll $A^2$ and the rolls $A^3$ being broken when no skin is between the same. Now according to the present invention a mechanism is provided by means of which by pressing a handle the measurement indicated on the dial may be printed on the skin and simultaneously recorded on a tape or band, and at the moment after this printing and recording has taken place the pawls $s^2$ will all be released automatically, and the segments B will thus all return to their initial position, ready for another skin. Simultaneously with the recording of the measurement the current number of the skin is also printed and recorded. The segment $D^4$ of the weighted lever D' engages the pinion E of the hand-spindle E', Fig. 4, and turns the said hand a distance corresponding to the movement of the segment B—*i. e.*, to the length of the skin passing between the rolls. The spindle E' carries a disk I, having British and foreign measurements thereon, and this disk is fast on the said spindle. A second disk is loosely mounted thereon (indicated by $H^3$) and having attached rigidly thereto a ratchet-wheel $H^2$, said disk having a corresponding scale thereon. This disk registers the current number of the skin. These disks are both provided with types for printing, and when the band is pressed against them by the mechanism hereinafter set forth they print the number on the same to which they have been adjusted. The tape or band is wound on a spool P', Fig. 5, pivotally supported at P, and passes over guide-roll $P^2$, past the periphery of the printing-rolls I and H³, between the two draw-rolls O⁴ and O⁵, one of which is positively driven by means of a pawl O⁷, pivoted to the upper end of a rock-lever O⁸, which in its turn is pivotally supported in the bracket M at O⁹. The lever end of this rock-lever carries pivotally attached thereto a pawl P³, which engages the ratchet-wheel H² of the measuring type-roll H³. Thus when the rock-lever O⁶ is rocked on its pivot it will alternately rotate the disk H³ one tooth—i. e., one number farther on—and also the roll O⁶ to move the tape or band to present a fresh surface for the impression of the next number and measurement. In a cylinder O of the bracket M a piston O¹⁰ is mounted to slide backward and forward, Figs. 4 and 5, and this piston is connected through a slot in the cylinder-wall with the lower end of the rock-lever O⁸. The piston is provided with a rod having an ink-pad O⁹ at its forward end, which when the piston is advanced against the pressure of its spring O' is forced against the type of the wheels H³ and I and, pressing the tape against the type to which the rolls or drums have been adjusted, produces the impression thereon. The spring O' returns the piston and pad to their normal positions. The rear end of the piston-rod extends out of the cylinder O at the opposite end to the pad and is provided with a pivotally-connected doggle T', Figs. 4 and 5, which is normally held in alinement with the said rod by means of a spring Y⁴, and the said doggle has a cam-surface at its outer end adapted to be operated on by a cone U, mounted upon the hand-lever M'. The said hand-lever is horizontally movable in the bracket M, and the stroke of its movement is limited by adjustable nuts X X at either side of a stop mounted on the bracket M, Fig. 4. Thus after the skin has passed the rolls A² and A³ and the printing-drums have been adjusted to show the length of the skin and its current number the handle M' is pushed in the direction of the arrow in Fig. 4 and the cone U meets the cam-surface of the doggle T', thus pushing the piston to the right of the same figure and projecting the pad against the type of the two wheels or drums and making the impression on the tape. When the hand-lever M' is withdrawn again, it will pass the doggle T', turning the same on its pivot against the action of the spring Y⁴, which when the cone U has passed pulls it back to its initial position, the spring O' returning the pad simultaneously.

In addition to the recording of the measurement and current number it is necessary that the same be printed on the skin itself, and this is accomplished by the following mechanism: Pivotally connected to a rail J' at the lower part of the machine-frame, Figs. 2 and 3, is a lever-arm J², carrying in its free bifurcated end two further type or printing drums J⁵ and J⁶, mounted on a spindle J⁸. J⁵ corresponds with H³ and has the same scales thereon, and J⁶ is provided with the scales similar to the drum I. Fast to the drum H³ is a chain or other suitable gear H', and fast to I a similar gear I', while the drums J⁵ and J⁶ are also provided with similar gears J⁴ and J⁷. W is a printing-pad mounted on the delivery-table A' beneath the drums J⁵ and J⁶, and Q² is a downwardly-projecting stamp having a trademark or the like, which may be imprinted on the skin. The drums J⁵ and J⁶ are capable of a downward movement, together with the stamp Q², which is affixed to the drum-carrying spindle J³, so that all these parts may be depressed simultaneously onto the pad and skin. The end of the lever J² carrying the printing-drums is normally held up off the table A' by means of a spring L², suspended from a bracket L', mounted on the rail J', Fig. 2. The spindle J³ is coupled to the spindle E by means of a yielding frame K' K², having its members pivotally connected at K³ and K⁴, at which point guide-rolls K⁵ are provided, over which chains K⁶ are guided. These chains connect the gear-wheels J⁴ and J⁷ to H' and I', respectively, and turn the lower printing-drums to the same adjustment as the upper ones. The frame is suitably guided by means of the stays K⁷ K⁸, extending to the sleeve K⁹, adapted to slide on a guide-pin K¹⁰ in the upper part T of the machine-frame. The lever J² is depressed to cause the impression by means of a vertically-guided rod N, Figs. 2 and 5, having at its upper end a doggle N', pivoted to it at N² and having a similar cam-surface to that of the doggle T', previously described. This doggle also projects into the path of movement of the cone U and is operated simultaneously with the doggle T', being returned to its normal position by the spring Y. Thus when the cone U passes this doggle it will depress the rod N, and this will depress the lever-arm J², producing the impression on the pad W and skin. As soon as this has been accomplished by further pushing in the hand-lever M' the nut X on the same will contact with the upper end of the lever M², pivotally mounted at M³ and having its lower end connected by a rod M⁴ with a lever M⁵, fast on the spindle s, to which all the detent-pawls s² are keyed, and thus by this movement of the lever M' all the detent-pawls will be simultaneously disengaged from their respective segments or quadrants R, and the parts will return to their initial position, the weight on the end of the lever D' returning it and the hand-spindle to their zero position. As will be seen from Figs. 1 and 4, the hand-lever M' may be provided with a short lever-arm R, which on turning the said hand-lever may be raised to contact with the free end of the lever-arm D' in case this lever should not have quite returned to its normal position; but under ordinary circumstances this arm R will not be required. Then the lever M' is pulled out again in the direction opposite to that indicated by the arrows in Fig. 4. The lever M² will be released and releases the pawls, bringing them into position to engage the quadrants B when they are again moved.

I claim as my invention—

1. In a machine for measuring material such as skins and the like, the combination with the measure-indicating mechanism of a series of printing-drums and means for simultaneously imprinting the results attained onto the skin or the like and on a moving tape or strip substantially as described.

2. In a machine of the class specified, the combination of a series of printing-drums and means for pressing an intermittently-moved tape or strip against one set to receive the impression to which the types have been adjusted and means for depressing another set to imprint the same impression on the material being measured substantially as described.

3. In a machine of the class specified, the combination of type-drums mounted on the measure-indicating spindle, means for intermittently moving a tape or strip of material past the said drums, a series of swingingly-supported type-drums mounted above the material being treated, means for adjusting the same from the indicating-spindle and means for pressing the tape or band against the first set of drums and simultaneously depressing the swingingly-mounted set onto the material after it has passed the measuring-rolls in the manner and for the purpose substantially as described.

4. In a machine of the class specified, the combination of a pair of type-drums mounted on the indicating-spindle, an intermittently-moving tape or band mounted in proximity thereto, one of said type-drums having a scale of measures and the other having current numbers, an ink-pad mounted at the rear of said tape and means for projecting the same against the type-drum, a second set of two type-drums mounted above the delivery-table of the machine and corresponding to the first-named set, means for adjusting them simultaneously with the latter and for depressing them, when adjusted down onto the material on the delivery-table, and means for turning the disk with the current numbers one number after each impression substantially as described.

5. In a machine of the class specified, the combination of type-drums on the indicating-spindle, one of which has the scale of measures and is rotated with said spindle, and the other being loosely mounted thereon, a lever mechanism consisting of a piston with inking-pad thereon movable toward and from the said type-drums, a hand-lever to project the same toward the said drums, and a rock-lever connected to said piston, draw-rolls to intermittently move a band or tape past the said drums between them and the said pad, and pawls to the said rock-lever to move one of the said rolls and the loosely-mounted type-drum at each oscillation of the said rock-lever substantially as described.

6. In a machine of the class specified, the combination of a set of type-drums on the indicating-spindle, means for adjusting one to the dimension of the skin or material being treated, and means for adjusting the other one step farther forward at each operation of the first drum, a corresponding set of type-drums mounted above the delivery-table and means for depressing the same onto the said table, a yielding frame, to connect the spindle of the indicating mechanism with that of the set of type-drums above the delivery-table, and chain-wheels and chains to couple the corresponding type-disks of each set to each other in the manner and for the purpose substantially as described.

7. In a machine of the class specified, the combination of a set of type-drums and means in connection with the same for imprinting the types adjusted by the passage of the material through the machine, onto an intermittently-moved tape or band, a second set of type-drums mounted above the delivery-table and means for depressing the same down onto the table, a hand-lever and means in connection therewith for pressing the tape onto the first set of drums and for depressing the second set down on the table when the said lever is moved and a lever system operated by the further movement of the said hand-lever to throw the detent-pawls of the measuring-quadrants out of engagement as soon as the recording-disks have been operated substantially as described.

In witness whereof I have hereunto set my hand in presence of two witnesses.

JOSEPH HALL.

Witnesses:
ALFRED MCINTIRE,
JOHN O. SMITH.